R. A. McLEOD.
PIPE TONGS.
APPLICATION FILED AUG. 21, 1913.
1,096,382.
Patented May 12, 1914.
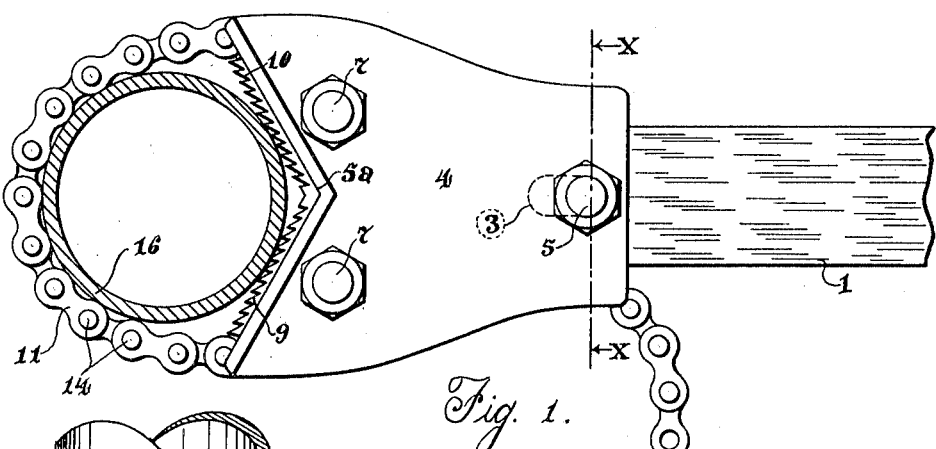
Fig. 1.
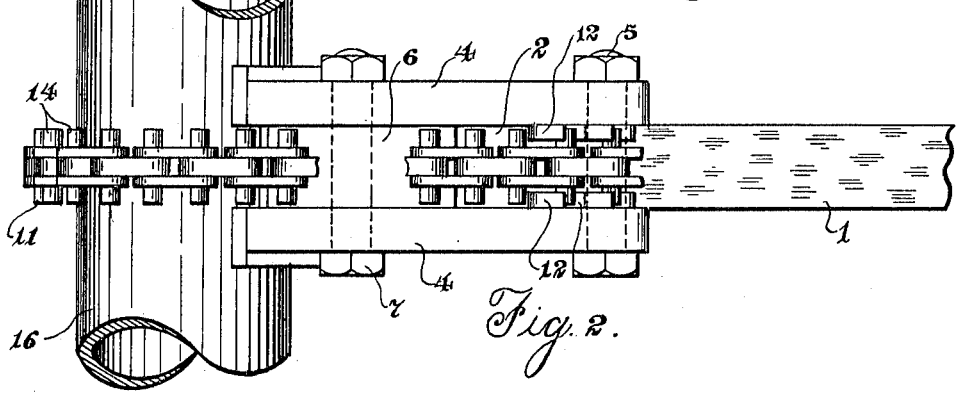
Fig. 2.
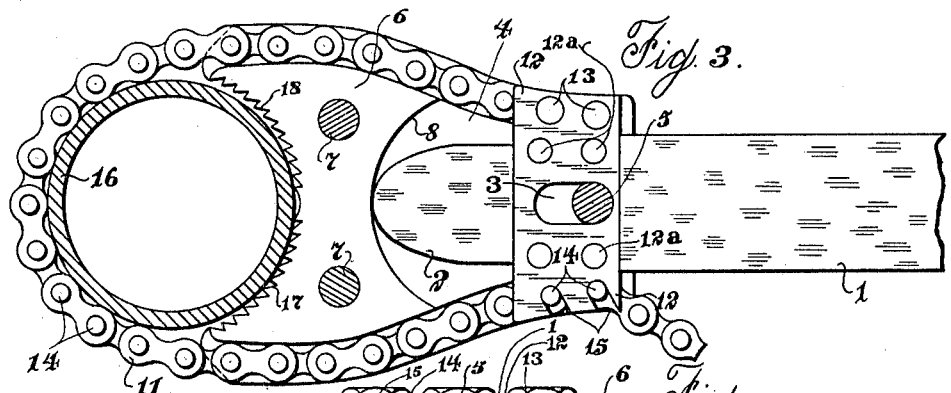
Fig. 3.
Fig. 4.
WITNESSES:
C. A. Ellis
O. C. Bruckner
INVENTOR
R. A. McLEOD
BY 
ATTORNEYS
COLUMBIA PLANOGRAPH CO., WASHINGTON, D. C.

UNITED STATES PATENT OFFICE.

REUBEN A. McLEOD, OF ELECTRA, TEXAS.

PIPE-TONGS.

1,096,382.  Specification of Letters Patent.  Patented May 12, 1914.

Application filed August 21, 1913. Serial No. 785,837.

*To all whom it may concern:*

Be it known that I, REUBEN A. MCLEOD, a citizen of the United States, residing at Electra, in the county of Wichita and State of Texas, have invented certain new and useful Improvements in Pipe-Tongs, of which the following is a specification.

My invention relates to a new and useful chain tongs. Its object is to provide a chain tongs which when engaged with a length of pipe will permit the application of a very strong rotative force to the pipe owing to the use in the tongs of a cam lever principle hereinafter made clear.

Another object of the invention is to provide a chain tongs which may be applied to produce rotation of a pipe in either direction.

Other objects are to provide a chain tongs which will not crush the pipe with which it is engaged, and which may be instantly released from the pipe by a slight angular displacement of the tongs handle.

A still further object of the invention is to provide a device of the character described that will be strong, durable, simple and efficient and comparatively inexpensive to produce, also one in which the several parts will not be likely to get out of working order.

With the above and other objects in view, the invention has relation to certain novel features of construction and operation, an example of which is described in the following specification and illustrated in the accompanying drawing, wherein;

Figure 1 is a top view of my chain tongs, showing the same engaged with a piece of pipe. Fig. 2 is a view of same in side elevation. Fig. 3 is a view similar to Fig. 1, showing the invention in a slightly modified form with one of its cover plates removed. Fig. 4 is a transverse sectional view of the tongs, the section being taken upon the line X—X of Fig. 1.

Referring now more particularly to the drawing, wherein like reference characters designate similar parts in all the figures, the numeral 1 denotes the manipulating lever of the tongs, which will preferably be of rectangular cross-section and will be gradually rounded between its lateral faces at its working extremity as indicated at 2.

A short distance from said extremity the lever 1 is formed with a slot 3 midway between its lateral faces and elongated longitudinally of the lever. The extremities of the slot will preferably be rounded as is clearly shown in Fig. 3. The working extremity of the lever 1 is inserted between the top and bottom cover plates 4, which have a pivoted connection with the lever by means of a bolt 5 passing through the slot 3, and through said plates, which are respectively engaged by the head of the bolt and a nut carried by its threaded end. At their points of connection with the lever 1, the plates 4 have a width somewhat greater than that of said lever, the plates projecting equally at each side of the lever. The lateral edges of the plates are so curved as to gradually increase their width from their pivoted to their free extremities. The free ends of the plates 4 are formed with obtuse angled V-shaped edges as indicated at 5$^a$. The free extremities of the plates 4 project a certain distance beyond the working end of the lever 1 and between the portions of said plates thus projecting, there is mounted a steel body 6 held in rigid relation to the plates by the bolts 7, said bolts serving also to establish a rigid relation between the plates 4. That edge of the body 6 which is nearest adjacent to the curved end of the lever 1 forms a circular arc 8 centered upon a line passing through the pin 5 and bisecting the distance between the lateral edges of the member 6, the radius of said arc being considerably less than the distance between the end of the lever 1 and slot 3 in said lever. That edge of the body 6 which is farthest removed from the lever 1 is formed with two widely divergent, oppositely serrated jaws 9 and 10 which project slightly from between the cover plates 4 and are parallel to the free ends of said plates. The lateral edge portions of the plates 4 project sufficiently beyond the lateral edges of the body 6 to permit certain portions of a tongs chain 11 to be housed between said portions of the cover plate. Into the top and bottom faces of the lever 1, there are set two rectangular plates 12, projecting equally at their extremities beyond the lateral edges of the lever and held in place by rivets 12$^a$ passing through the lever. The slot 3 in the lever passes also through the plates 12. One extremity of the chain 11 is permanently secured between the projecting ends of the plates 12 at one side of the lever, the connection being established by rivets 13. The pins 14 which establish a pivotal connection between the links of said chain 11 have their extremities projecting at each side of the same so that the extremities of any two adjacent pins 14 in the free end portion of the chain may be engaged in recesses 15 formed in the other projecting extremities of the plates 12. In the modified form of my invention shown in Fig. 3, the member 1 is formed with a substantially semi-circular arcuate edge, to replace the jaws 9 and 10, the serrations of said edge being oppositely pointed at each side of its center as indicated at 17 and 18 respectively.

In the above described invention, the serrated jaws 9 and 10, or the serrated edges 17 and 18 are first brought into contact with the pipe which is to be rotated as shown in the drawing. The chain 11 is then passed around the pipe, leaving as little slack as possible, and its free end portion is secured by engaging two adjacent pins 14 of said end portion in the recesses 15. The lever is now manually subjected to an angular displacement in the direction in which it is desired to rotate the pipe. During this displacement, said lever will pivot about the bolt 5, its cam-forming extremity 2 sliding upon the circular face 8 of the member 6. This sliding engagement between the portion 2 of the lever and the portion 8 of the member 6 will displace the working end of the lever away from the pipe 16 which is engaged by the tongs, the slot 3 permitting the relative movement between the bolt 5 and the lever which must take place during angular displacement of the lever. Consequently the chain 11 is drawn tight against the pipe 16 engaging said pipe very firmly with the serrated jaws 9 and 10 and forcing the pipe to participate in the rotation which is being impressed upon the tongs. In one direction of rotation the teeth of the jaw 9 will resist the tendency of the pipe 16 to remain stationary and in the other direction of rotation the teeth of the jaw 10 will accomplish a similar effect. Thus the pipe 16 may be rotated in either direction without changing the manner in which it is engaged with the tongs. The cam lever principle by which the chain is gradually drawn taut as the cam portion 2 of the lever travels about the curve 8 permits a strong rotative force to be applied to the pipe.

The invention is presented as including all such modifications and changes as properly come within the scope of the following claims.

What I claim is:

1. In a device of the character described, the combination with a lever having one of its extremities rounded between the lateral faces of the lever, of opposite plates mounted upon the top and bottom faces of the lever adjacent to its rounded end, a pair of cover plates pivoted upon the top and bottom faces of the lever adjacent to its rounded end and adapted to undergo a limited sliding displacement longitudinally of the lever, a body rigidly mounted between said plates formed with an arcuate edge of lesser radius than the distance from the end of the lever to the pivotal point of said plates, and formed with a pair of oppositely serrated jaws projecting from between said plates, and a chain having one of its extremities rigidly engaged between the plates carried by the lever at one side of the lever, the other extremity thereof being adapted to engage removably between said plates at the other side of the lever.

2. In a device of the character described, the combination with a lever having a rounded end and formed with a central slot longitudinally of the lever adjacent to said rounded end, of a pair of plates mounted upon the top and bottom faces of the lever opposite to said slot, a pin mounted in said slot, a pair of plates between which the rounded extremity of the lever is inserted, said plates being engaged by the opposite ends of said pin, a body rigidly mounted between said cover plates formed with an arcuate face adapted to contact with the rounded end of the lever and formed also with a pair of oppositely serrated jaws projecting from between said plates, and a pivot link chain having one of its extremities permanently mounted between the plates carried by the lever at one side of the lever and the other separably mounted between said plates at the other side of the lever.

3. In a device of the character described, the combination with a lever having a rounded end, and formed with a central slot longitudinally of the lever adjacent to said rounded end, of a pair of plates mounted upon the top and bottom faces of the lever opposite to said slot, a pin mounted in said slot, a pair of parallel cover plates engaging opposite faces of the lever and rigidly engaged by opposite ends of said pin, the width of said plates being gradually increased from their pivoted to their free extremity, a body rigidly engaged between said cover plates, having an arcuate edge with which the rounded extremity of the lever has sliding contact when the lever is subjected to angular displacement about its pivot pin, said body being also formed with a pair of oppositely serrated jaws projecting from between the free ends of said plates, and a chain having one of its extremities secured between the plates carried by the lever at one side of the lever, the other extremity of said chain being adapted to separably engage between said plates at the other side of the lever, certain portions of the chain being housed between the lateral
5 edge portions of the cover plates when the device is in use.

In testimony whereof I have signed my name to this specification in the presence of two subscribing witnesses.

REUBEN A. McLEOD.

Witnesses:
HARVEY HARRIS,
W. H. YOUNG.